(No Model.)
R. C. SMITH.
SLIDE RULE FOR LOGARITHMIC CALCULATIONS.
No. 450,640. Patented Apr. 21, 1891.
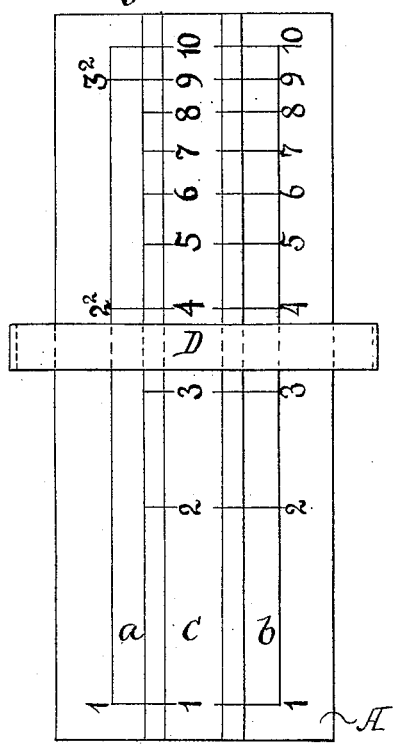
Fig. 2.
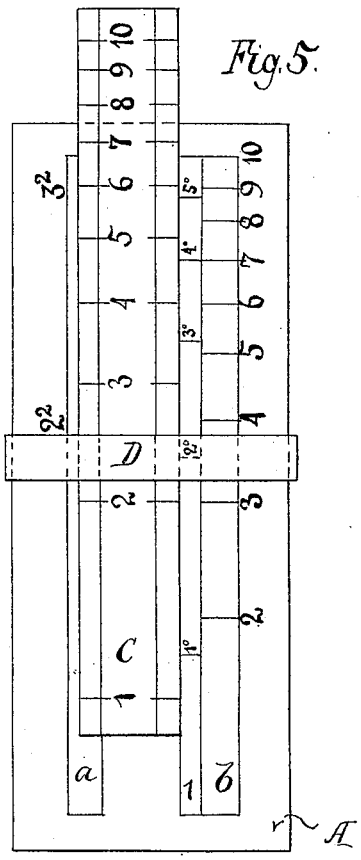
Fig. 5.
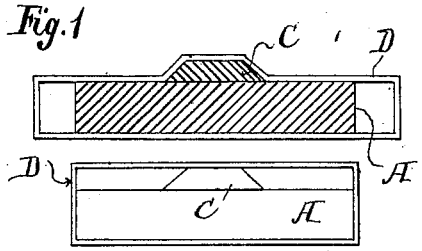
Fig. 1.
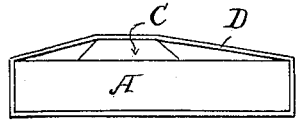
Fig. 4.
Fig. 3.
WITNESSES:
INVENTOR
Rudolph C. Smith.
THE NORRIS PETERS CO., PHOTO-LITHO., WASHINGTON, D. C.

UNITED STATES PATENT OFFICE.

RUDOLPH C. SMITH, OF YONKERS, NEW YORK.

SLIDE-RULE FOR LOGARITHMIC CALCULATIONS.

SPECIFICATION forming part of Letters Patent No. 450,640, dated April 21, 1891.

Application filed September 15, 1888. Serial No. 285,547. (No model.)

*To all whom it may concern:*

Be it known that I, RUDOLPH C. SMITH, a citizen of the United States, residing at Yonkers, in the county of Westchester and State of New York, have invented a new and useful Slide-Rule, of which the following is a specification.

My invention relates to improvements in slide-rules in which lines having their lengths corresponding to the numbers by which these lengths are marked are brought in juxtaposition to indicate and perform mathematical operations; and the object of my improvements is to enlarge the facilities for changing the relative position of the parts of the rule, and also to distinguish the division-points on the scale with greater clearness and readiness. I attain these objects by the mechanism illustrated in the accompanying drawings, in which—

Figure 1 is a cross-section, and Fig. 2 is a top view, of the rule. Figs. 3, 4, and 5 show modifications of the elastic sleeve.

Similar letters refer to similar parts throughout the several views.

The main body portion A of the rule has a number of scales, on which certain lengths are marked with certain numbers. The scale $a$ is divided in lengths, each corresponding to the mantissa of the logarithm of the square of that number by which the end of the length is marked, and this is made clear by fixing the exponent 2 to the number. The lengths on scale $b$ represent the mantissa of the logarithms of the numbers marked on the divisions.

The slide C is divided on both edges to correspond to the lower scale $b$, and with the same divisions. The above scales are those of the well-known Gunter scale; but I have added the exponent 2 to the numerals of the scale $a$, thereby obtaining the new result that when the slide is properly adjusted any numeral on the scale $a$ will correspond with the square of that numeral on the slide C, and the mathematical result will be correctly indicated. Thus $2^2$ will correspond with 4, $3^2$ with 9, &c.

Formerly the adjustment of the scale C would bring 4 on the scale C to 2 on the scale $a$, and the mathematical result was not correctly indicated, the user having to bear in mind that the 2 on the scale $a$ represented the square root of the number.

A sleeve D is made wide enough to allow longitudinal and lateral motion of the slide C in any suitable way to bring the scales marked on this slide in juxtaposition with any of the scales marked on the body. This sleeve may be made to bring the scales marked on this slide in juxtaposition with any of the scales marked on the body. This sleeve may be made of metal or any suitable elastic material. If made of metal the sleeve may be made wider than the width of the lower rule and with spring enough to keep the upper rule in the position to which it is set, as in Figs. 1 and 2, or it may be made larger than the combined thickness of the two rules, so as to allow the upper rule to slide underneath, as shown in Fig. 3. It may be also made of material elastic enough to allow by its stretch sufficient side motion of the upper rule to be brought in proper position with any of the scales marked on the lower rule, as in Figs. 4 and 5.

Heretofore the upper rule has been made to slide in a recess of the body of the lower scale which only allowed longitudinal motion and curtailed to a great extent the ready use of the instrument.

What I claim is—

1. A slide-rule consisting of two sections laterally and longitudinally movable one upon the surface of the other, and a sleeve for holding the sections together while permitting them to move relatively, substantially as described.

2. A slide-rule composed of a body and a slide, each having scales, the numerals of the scale $a$ on the body having exponents affixed to them, substantially as described, and for the purpose set forth.

RUDOLPH C. SMITH.

Witnesses:
J. R. LEWEIRA,
WILLIAM MOLLOY.